United States Patent

[11] 3,602,696

| [72] | Inventor | John Joyce<br>62 Bay View Drive, East Brewster, Mass. 02640 |
|---|---|---|
| [21] | Appl. No. | 19,451 |
| [22] | Filed | Mar. 13, 1970 |
| [45] | Patented | Aug. 31, 1971<br>Continuation-in-part of application Ser. No. 437,400, Mar. 5, 1965, now abandoned. |

[54] PLURAL SHEET ACCOUNTING FORM WITH MEANS TO EXECUTE AND VERIFY THE SAME
9 Claims, 17 Drawing Figs.

[52] U.S. Cl. ............................................. 235/61.11
    R, 235/61.12 R, 35/2, 346/141
[51] Int. Cl. .............................................. G06r 5/02
[50] Field of Search ...................................... 346/82,
    104, 141; 235/61.12, 61.11, 61.112, 61.113; 35/2, 48.1

[56] References Cited
UNITED STATES PATENTS

| 1,070,342 | 8/1913 | Hoffman | 35/2 |
| 1,667,852 | 5/1928 | Gluck | 235/61.12 |
| 2,307,617 | 1/1943 | Braun | 235/61.12 |
| 2,344,585 | 3/1944 | Bailey | 235/61.11 |
| 2,357,444 | 9/1944 | Armbruster | 235/61.12 |
| 2,390,439 | 12/1945 | Johnson | 35/2 |
| 2,525,837 | 10/1950 | Simplair | 235/61.12 |
| 2,980,319 | 4/1961 | Clemens et al. | 235/61.11 |
| 3,224,116 | 12/1965 | DePue | 35/48.1 |

FOREIGN PATENTS

| 987,280 | 3/1965 | Great Britain | 235/61.12 |

*Primary Examiner*—Thomas A. Robinson
*Attorney*—Abbott Spear

ABSTRACT: An accounting system is disclosed utilizing sets of superimposed opaque receipt cards separably joined together, each card having zones for locating punch holes in a predetermined manner indicative of receipt data. The punch holes are made by the agent utilizing a debtor card retained by the debtor and provided with a series of dies for punching simultaneously a series of holes in a selected portion of said cards, the dies being arranged in an individual pattern. The system also utilizes a reader in the form of a base for orienting any one of said cards with reference to a particular position relative thereto, the reader having indicia visible through the holes in said cards made by the debtor card enabling the receipt data and the die-established data to be observed therethrough on such orientation.

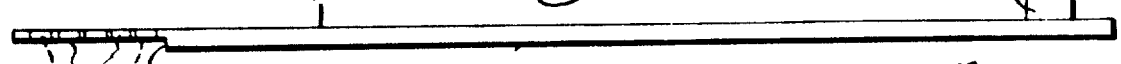

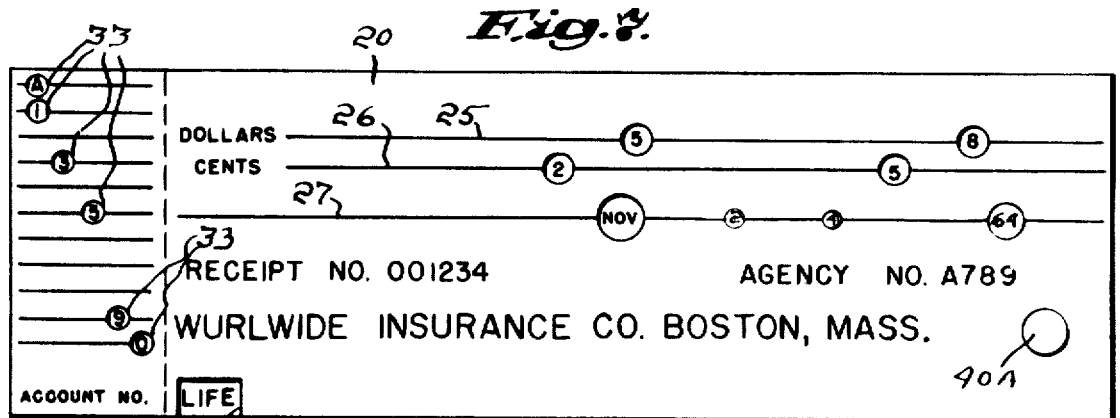

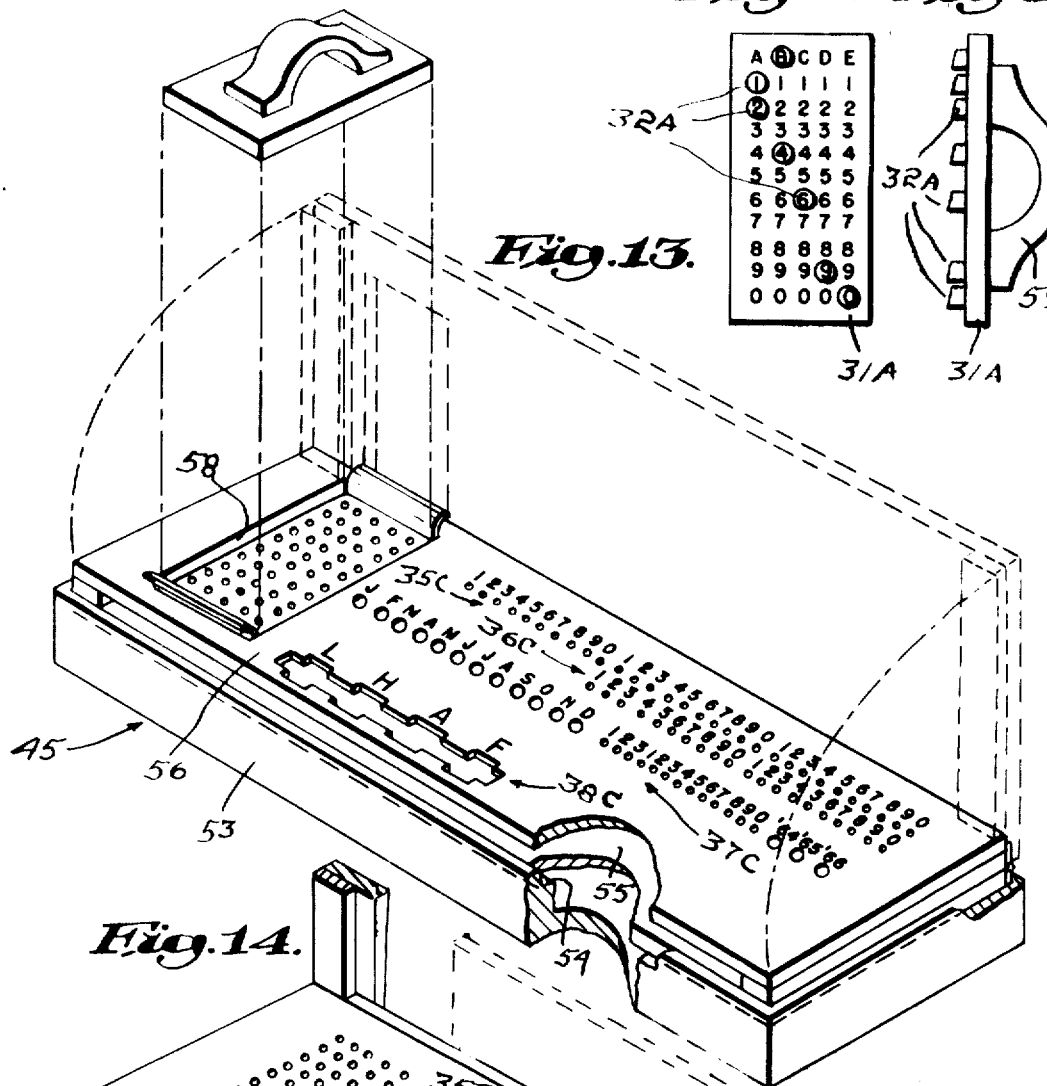

PLURAL SHEET ACCOUNTING FORM WITH MEANS TO EXECUTE AND VERIFY THE SAME

The present invention relates to accounting systems where plural receipts are used. The present application is a continuation-in-part of my copending application Ser. No. 437,400 filed Mar. 5, 1965 now abandoned.

One of the problems confronting business is the amount of paper work, and the attendant expense, that is involved even in routine operations. While this problem is widespread, it is herein discussed with particular reference to the monthly payment of insurance premiums.

In the payment of such premiums, the agent usually must fill out at least three original copies in connection with each payment. A common practice, upon the payment of a premium, is for the agent to record the pertinent data in the customer's book, in his own book, and later, this data is transferred to the records of the company. The procedure is time consuming and is, of course, subject to human error.

The general objective of the present invention is to provide a plural receipt system that simplifies the basis of recording a transaction and the preparation of the required receipts. In accordance with the invention, this objective is attained with a system including a set of superimposed opaque receipt blanks separably joined together and having zones for locating punch holes in a predetermined manner indicative of receipt data, the punched holes to be made by the person receiving the money, the agent, for example.

The system includes a reader having indicia thereon readable through the punched holes in a receipt when the receipt has been properly oriented on the reader, the reader and the receipt having portions facilitating such orientation. In practice, the debtor, the policy holder, for example, has such a reader and, in unsophisticated systems, the company also has one. In sophisticated systems, the receipt may be used with computers or adding machines may be adapted to receive them.

One of the advantages of a system in accordance with the invention is that the receipts are unintelligible without a reader or a more sophisticated reading system. In order that this characteristic may be true as to the identity of the debtor, a further objective of the invention is to provide him with a register or debtor card provided with a series of dies for punching a series of holes in a selected portion of the blanks, the dies being arranged in an individual pattern. The agent uses this register or card in perforating the blanks to complete the recording of the necessary data.

The register or card is then returned to the debtor together with one (usually the first) original receipt and he may check its accuracy with his reader. The agent keeps one of the other original receipts and forwards another to the home office, for example.

A system in accordance with the invention also provides a device to facilitate the accurate punching of the several blanks, the device consisting of a box and a pair of superimposed plates between which the blanks are placed. The plates have registering holes therethrough and the upper plate also has identifying indicia associated with the holes except for those by which the identity of the debtor is to be established, the debtor register or card determining and effecting the correct hold punching for that purpose when properly positioned in the device.

In the accompanying drawings, there are shown illustrative embodiments of the invention from which these and other of its objectives, novel features, and advantages will be readily apparent. In the drawings:

FIG. 1 is a face view of a set of receipt blanks;

FIG. 2 is a side view thereof;

FIG. 3 is a face view of one of the blanks provided with certain information by means of punched holes in predetermined zones;

FIG. 4 is a face view of a reader of the type retained by the policy holder with identifying holes punched in a predetermined zone;

FIG. 5 is an edge view thereof;

FIG. 6 is a face view of the insert added to the reader to complete it for his identification;

FIG. 7 is a face view of the completed reader with the blank of FIG. 3 positioned thereon, certain additional information having been imparted thereto by the debtors punching card;

FIG. 8 is an edge view thereof;

FIG. 9 is a face view of the master reader;

FIG. 10 is a side view thereof;

FIG. 11 is a face view of a debtor's hole-punching card;

FIG. 12 is a side view thereof;

FIG. 13 is a perspective view of a card punching device to be carried by the agent;

FIG. 14 is a fragmentary view thereof with the upper plate swung upwardly to expose the lower plate;

FIG. 15 is a perspective view of a hole-punching device for use by the agent with the card receiver of FIGS. 13 and 14;

FIG. 16 is a face view of a debtor's hole-punching card for use in the device shown in FIGS. 13 and 14; and FIG. 17 is a side view thereof.

In accordance with the invention, an accounting system uses a plurality of superimposed, opaque blanks, the blanks 20, 21, and 22 in the embodiment shown in FIGS. 1 and 2. The blanks are detachably joined together at one end as by staples 23 and shown as having score lines 24 to facilitate their separation one from the others. In practice, thin sheets of a plastic that is not easily accidentally torn are preferred.

The blanks may be identical and reference is made to the blank 20 which is shown as having first, second, and third parallel, lengthwise lines 25, 26, and 27, the first for dollars, the second for cents, and the third for the date of the transaction. The lines 25, 26, and 27 are located to the right of a series of parallel lines in the generally indicated zone 28 for the account number identifying the debtor. Near the right-hand end of each blank there is a hole 29.

Reference is now made to FIG. 3 wherein the blank 20 is shown as having two spaced holes 25A and 25B along the line 25, two holes 26A and 26B spaced along the line 26 and four holes 27A, 27B, 27C, and 27D spaced along the line 27. It will be noted that the holes in the lines 25 and 26 are all of the same size, while the holes 27A and 27D are somewhat larger with the hole 27A being larger than the hole 27D. It will also be noted that the holes 27B and 27C are also of the same size but smaller than the holes in the lines 25 and 26. The embodiment of the invention illustrated by the drawings provides blanks that may be used in connection with different types of insurance policies even though they might not be serviced by the same agent. For that reason, the blanks are shown as having a cutout 30 in their lower margin located in a particular position which might be formed before the blanks were given to the agent or which might be made by him in a manner presently to be described.

The blanks are now complete except for data identifying the account number. In accordance with the invention, the debtor is provided with a series of dies 32 which represent his account number, for example. The card 31 is borrowed by the agent and is placed by him on the uppermost blank 20 with its dies 32 downward and with edges in alignment with corresponding edges of the zone 28 to thereby enable the user to punch a series of corresponding holes 33 through each of the blanks, see FIG. 7.

As the blanks now have all the needed information, the blanks are separated one from another. The blanks may be read on the master reader shown in FIGS. 9 and 10. The master reader consists of a base 34 shown as of the same size and shape as the blanks and as having a line of numbers 35, three groups of digits from 1–0, for example, a line of numbers 36, two groups of digits from 1–0, for example, and a third line 37. The third line contains the abbreviations for the twelve months of the year, the numbers 1–3, a group of digits from 1–0, and year identifying dates. It will also be noted that in a line 38, words are printed identifying the different types of policies and, when the system is to be read, the name of the appropriate type is exposed in the cutout 30. It will also be noted that the base 34 has a generally indicated zone 39 having columns of numbers from 1–10, five such columns being shown and headed by the letters A to E. The zone 39 corresponds to the zones 28 of the blanks.

As the blank and reader base 34 are of the same size and shape, proper positioning is effected, when a punched blank is positioned on the reader base 34, by bringing corresponding edges of the blank and the reader base 34 into alignment. Such positioning is facilitated by the provision of the base 34 with a stud 40 which fits the hole 29 with which each blank is provided. When a blank is properly positioned on the reader base 34, the lines 25, 26, and 27 register with the lines 35, 36 and 37, respectively, and expose indicia enabling the blank to be read as to the amount of the payment and the date thereof. The type of policy is also shown in the cutout 30 and, in the zone 39, indicia is exposed giving the account number by which the debtor is identified.

In FIGS. 4 and 5 a reader is shown that is for use by the policy holder and to be retained by him, the reader having a base 41 shown as of the same size and shape as the reader base 34 and having four lines of indicia thereon identical to that with which the reader base 34 is provided. The indicia on the reader base 41 is identified by the suffix addition "A."

The reader base 41 is also provided with a zone 42 at one end corresponding to the zones 28 of the blanks. The base 41 is of reduced thickness in the zone 42 providing a transverse shoulder 43 on its undersurface and at its other end has a stud 40A.

A series of holes 33A are punched in the zone 42 by means of the dies 32 of the debtor's card 31 with the debtor card placed on the reader base 41 with its edges in alignment with the edges of the zone 42. A sheet 44, see FIG. 6, has the same indicia as the zone 39 and is spaced and arranged in the same manner. After the punching of the zone 42, the sheet 44 is secured to the undersurface of the zone 42 with only the debtor's account number being exposed. FIGS. 7 and 8 illustrate the reader of FIGS. 4 and 5 completed by the addition of the sheet 44 and with the debtor's receipt blank 20 positioned thereon.

To ensure that the blanks will be accurately punched by the agent, he is provided with a device, generally indicated at 45, to hold the blanks while they are being punched by an appropriate one of the dies 46, 47, 48, 49, and 50 of the punch 51, the dies being radially disposed on a rotatable mount 52.

The blank holding device 45 shown in the drawings consists of a boxlike base 53 having a marginal shoulder 54 providing a seat for the lower plate 55 to which an upper plate 56 is hinged to enable a set of blanks to be introduced between them and held by the entry of the stud 57 into their holes 29.

The lower plate 55 has a series of holes corresponding to the indicia with which the master reader base 38 is provided and the corresponding reference numerals are distinguished by the suffix addition "B," while the upper plate 56 has like series of holes and assorted indicia with the corresponding reference numerals being distinguished by the suffix addition "C," corresponding holes of the plate being in vertical registry when the upper plate 56 is above the lower plate 55 and the corresponding lines of holes being vertically aligned with the lines 25, 26, 27, and 28 of the interposed blanks.

The agent then punches the positioned blanks using the die 46 for the holes in the lines 25 and 26, the die 47 for the "month" punching, the die 48 for the "year" punching, and the die 49 for the "day" punching. The die 50 is used where the agent is to provide the blanks with a cutout to show the policy type.

The lower plate 55 also is provided with a series of holes in a zone 39B, the holes in that zone corresponding to the indicia in the zone 39 on the reader base 34. The plate 56 also has a cutout 58 of the size and shape of the zones 28 and 39B to receive the debtor card 31 or the debtor card 31A shown in FIGS. 16 and 17. The debtor card 31A has dies 32A and these are shown as each having its ends provided with appropriate indicia and also provided with a handle 59 to facilitate its use but otherwise identical in construction and use to the card 31.

It should be noted that the card 31 or the card 31A could be used in place of the sheet 44 to complete the reader that is to be retained by the policy holder and the dies of such cards are long enough to permit their use, by themselves or in conjunction with studs for entry into the holes 29 of the blanks, in properly positioning the blanks relative to their readers.

It is contemplated that the card shown in FIGS. 11 and 12 or the card shown in FIGS. 16 and 17 will be carried by the debtor as by attaching it to a key chain. Many shopping areas afford the opportunity for customers to pay their monthly utility bills there and systems in accordance with the invention are well adapted to this purpose, affording economy and convenience to debtor and creditor alike.

From the foregoing, it will be apparent that the invention provides a base for quickly, easily, and accurately recording information of which payment receipts is but one example, the recorded information being in a form adapted for use in various relatively sophisticated accounting systems while still enabling the recorded data to be read by authorized persons.

I claim:

1. In combination and for use in an accounting system with a card reader having a range of receipt data on a first portion and a range of indicia on a second portion useful in identifying a particular debtor, a debtor card including a series of dies protruding from one face thereof and arranged in an individual pattern to indicate the identification of a particular debtor, and a holder for use in supporting at least one reader card of the dimensions required by the reader while holes are being punched in a predetermined area thereof by said dies to indicate the identity of a particular debtor, said holder including a guide establishing a predetermined position of the debtor card while its dies are being forced through the supported reader card thereby to insure that the debtor identifying holes in the holder-supported card accurately correspond to the appropriate debtor identifying indicia of the card reader.

2. The combination of claim 1 in which there are a plurality of supported reader cards, the cards being detachably interconnected, the holes being punched therethrough while interconnected.

3. The combination of claim 1 in which the dies of the debtor card have indicia on their exposed ends and complete the reader card when they extend upwardly therethrough.

4. The combination of claim 1 in which the dies of the debtor card complete the reader card when they extend upwardly therethrough and are of sufficient length to function as means for orienting and holding a subsequently punched card relative to the reader card.

5. A holder for use in simultaneously punching a series of blanks, said holder comprising a pair of plates, each plate having a plurality of apertures extending therethrough, the apertures registering when one plate is above the other in a predetermined relationship, the plate that is then uppermost having indicia associated with its apertures by which holes can be punched through said series of blanks when interposed between the two plates in said relationship with the punched holes then being indicative of such information as amounts of payment and dates thereof, the plate that is then lowermost bearing a series of dies located so as to represent a particular debtor identification number and punching corresponding holes through said interposed blanks.

6. The holder of claim 5 in which the holder is in the form of a box, the uppermost plate being hinged to the box and the lowermost plate being supported by the box above the bottom thereof.

7. A reader for use in an accounting system providing cards, each card having a first series of apertures punched in a portion thereof to indicate receipt data, and a second series of apertures punched in a second portion thereof to indicate the identification number of a particular debtor, said reader comprising a base having a series of indicia some of which are readable through the first series of apertures to interpret the data they represent when one of the cards has been oriented relative to the base in a predetermined manner, and said reader also including a plate including a series of dies extending upwardly through the reader and having indicia exposed to be read through said second series of apertures to interpret the identification number they represent when the blank is oriented relative to said base.

8. The reader of claim 7 in which the reader has a recessed area the size, shape and thickness of said plate.

9. The reader of claim 7 in which the dies of the plate extend upwardly through the reader and are means for orienting the appropriate blank relative thereto.